US012560788B2

(12) United States Patent
Hung et al.

(10) Patent No.: US 12,560,788 B2
(45) Date of Patent: Feb. 24, 2026

(54) TELEPROMPTER

(71) Applicant: ATEN INTERNATIONAL CO., LTD., New Taipei (TW)

(72) Inventors: Tzu-Chieh Hung, New Taipei (TW); Jhih-Yu Chen, New Taipei (TW); Pei-Chun Lai, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 48 days.

(21) Appl. No.: 18/776,235

(22) Filed: Jul. 17, 2024

(65) Prior Publication Data

US 2025/0085521 A1 Mar. 13, 2025

(30) Foreign Application Priority Data

Sep. 7, 2023 (TW) ................................. 112134153

(51) Int. Cl.
| | |
|---|---|
| *G02B 17/00* | (2006.01) |
| *G02B 27/02* | (2006.01) |
| *G02B 27/14* | (2006.01) |
| *G03B 21/14* | (2006.01) |
| *G03B 21/28* | (2006.01) |

(52) U.S. Cl.
CPC ......... *G02B 17/004* (2013.01); *G02B 27/021* (2013.01); *G02B 27/026* (2013.01); *G02B 27/144* (2013.01); *G03B 21/145* (2013.01); *G03B 21/28* (2013.01)

(58) Field of Classification Search
CPC .... G03B 21/28; G03B 21/145; G02B 17/004; G02B 27/144; G02B 27/021; G02B 27/026

USPC ......................................................... 348/344
See application file for complete search history.

(56) References Cited

U.S. PATENT DOCUMENTS

| | | | | |
|---|---|---|---|---|
| 6,980,253 B1 * | 12/2005 | Matsui | ................. | H04N 5/2222 |
| | | | | 348/375 |
| 9,013,629 B2 * | 4/2015 | Vito | ..................... | H04N 5/2222 |
| | | | | 348/375 |
| 9,030,603 B1 * | 5/2015 | Vito | ..................... | H04N 5/2222 |
| | | | | 348/375 |
| 9,874,758 B2 * | 1/2018 | Giraldo | ................. | G02B 27/022 |
| 9,876,945 B2 * | 1/2018 | Arce | ...................... | H04N 23/55 |
| 10,491,785 B1 | 11/2019 | Arnot | | |
| 10,972,640 B2 | 4/2021 | Linda | | |
| 12,081,900 B2 * | 9/2024 | Gentile | ................. | G03B 29/00 |
| 12,160,679 B2 * | 12/2024 | Huang | ................. | H04N 5/2222 |

(Continued)

*Primary Examiner* — Pritham D Prabhakher
(74) *Attorney, Agent, or Firm* — CKC & Partners Co., LLC

(57) ABSTRACT

A teleprompter includes an accommodating space and an optical assembly disposed in the accommodating space. The accommodating space is configured for accommodating an electronic device including an image display unit and a lens. The image display unit is configured to emit a light along a first path. The optical assembly includes a light-reflecting unit and a beam-splitting unit. The light-reflecting unit is configured to divert the light from the first path to a second path and has a first light-reflecting portion disposed on the first path. The beam-splitting unit is disposed on the second path and is configured to allow a first portion of the light to transmit and divert a second portion of the light from the second path to a third path. The third path has a same direction as a direction of an optic axis of the lens.

6 Claims, 12 Drawing Sheets

(56)                 References Cited

U.S. PATENT DOCUMENTS

| | | | |
|---|---|---|---|
| 2009/0256970 A1* | 10/2009 | Bilbrey | H04N 5/2222 |
| | | | 348/722 |
| 2010/0182513 A1* | 7/2010 | DeOtte | H04N 5/2222 |
| | | | 348/E5.022 |
| 2014/0247497 A1 | 9/2014 | Giraldo | |
| 2015/0009402 A1* | 1/2015 | Vito | H04N 23/51 |
| | | | 348/375 |
| 2015/0138303 A1* | 5/2015 | White | H04N 7/144 |
| | | | 348/14.07 |
| 2017/0064158 A1* | 3/2017 | Arce | H04N 5/2222 |
| 2020/0314296 A1* | 10/2020 | Vito | H04N 23/51 |
| 2021/0360144 A1* | 11/2021 | Rosensweig | H04N 23/56 |
| 2022/0094820 A1* | 3/2022 | Huang | G02B 27/144 |
| 2023/0124178 A1* | 4/2023 | Heshmat Dehkordi | |
| | | | G02B 30/56 |
| | | | 359/1 |

* cited by examiner

TELEPROMPTER

CROSS-REFERENCE TO RELATED APPLICATION

This application claims priority to Taiwan Application Serial Number 112134153, filed Sep. 7, 2023, which is herein incorporated by reference.

BACKGROUND

Technical Field

The present disclosure relates to a teleprompter.

Description of Related Art

Teleprompter systems commonly used to prompt users, for example, actors or lecturers, with lines or images are made up of an image display device and a camera.

However, these teleprompter systems function based on proper connection and synchronization of the image display device and the camera with certain specifications. Otherwise, the image quality may be adversely affected due to improper installation between the image display device and the camera. For example, if the image display device is distant from the camera, the user shown on the screen may seem to be not looking into the camera when he or she is reading a manuscript. Adjusting settings to eliminate such imperfection requires much time and effort.

In addition, due to the increasingly powerful performance of personal mobile devices such as smartphones and the rising popularity of personal broadcasting, demand for teleprompter systems is surging. However, teleprompter systems on the market require collaboration with multiple personal mobile devices. Some examples are disclosed in U.S. Pat. Nos. 10,491,785 and 10,972,640. In these examples, a display device for subtitle display and a camera for shooting are required. This results in a high overall price for building a teleprompter system. Also, such a teleprompter system may take up much space and may require separate control of the image display device and the camera. Otherwise, a communication connection between the image display device and the camera must be set up so that the image display device and the camera can be synchronized during the recording session.

Accordingly, how to provide a teleprompter to solve the aforementioned problems becomes an important issue to be solved by those in the industry.

SUMMARY

An aspect of the disclosure is to provide a teleprompter that may efficiently solve the aforementioned problems.

According to an embodiment of the disclosure, a teleprompter includes an accommodating space and an optical assembly. The accommodating space is configured for accommodating an electronic device. The electronic device includes an image display unit and a lens. The image display unit is configured to emit a light along a first path. The optical assembly is disposed in the accommodating space. The optical assembly includes a light-reflecting unit and a beam-splitting unit. The light-reflecting unit is configured to divert the light from the first path to a second path. The light-reflecting unit has a first light-reflecting portion. The first light-reflecting portion is disposed on the first path. The beam-splitting unit is disposed on the second path. The beam-splitting unit is configured to allow a first portion of the light to transmit and to divert a second portion of the light from the second path to a third path. The third path has a same direction as a direction of an optic axis of the lens.

In an embodiment of the disclosure, the optical assembly is disposed on a side of the electronic device, the image display unit faces the first light-reflecting portion of the light-reflecting unit, and the lens faces the beam-splitting unit.

In an embodiment of the disclosure, the first light-reflecting portion of the light-reflecting unit is substantially parallel to the beam-splitting unit.

In an embodiment of the disclosure, a unit vector $\hat{r}_1$ along the second path, a unit vector $\hat{r}_2$ along the third path, and a unit normal vector $\hat{n}_1$ of the first light-reflecting portion of the light-reflecting unit satisfy an equation: $\hat{r}_2 = \hat{r}_1 - 2(\hat{r}_1 \cdot \hat{n}_1)\hat{n}_1$.

In an embodiment of the disclosure, the teleprompter further includes a block body disposed in the accommodating space opposing the electronic device.

In an embodiment of the disclosure, the lens is disposed on a first surface of the electronic device, the image display unit is disposed on a second surface of the electronic device opposing the first surface, the first surface faces the beam-splitting unit, and the second surface faces the first light-reflecting portion of the light-reflecting unit.

In an embodiment of the disclosure, the light-reflecting unit further includes a second light-reflecting portion and a third light-reflecting portion, wherein the first light-reflecting portion is configured to divert the light from the first path to a fourth path, the third light-reflecting portion is configured to divert the light from the fourth path to a fifth path, and the second light-reflecting portion is configured to divert the light from the fifth path to the second path.

In an embodiment of the disclosure, the second light-reflecting portion of the light-reflecting unit is substantially parallel to the beam-splitting unit.

In an embodiment of the disclosure, the first path is substantially parallel to the fifth path.

In an embodiment of the disclosure, a unit vector $\hat{r}_1$ along the second path, a unit vector $\hat{r}_2$ along the third path, and a unit normal vector $\hat{n}_1$ of the second light-reflecting portion of the light-reflecting unit satisfy an equation: $\hat{r}_2 = \hat{r}_1 - 2(\hat{r}_1 \cdot \hat{n}_1)\hat{n}_1$.

In an embodiment of the disclosure, the teleprompter further includes a block body disposed in the accommodating space opposing the electronic device and disposed between the second light-reflecting portion and the third light-reflecting portion.

In an embodiment of the disclosure, the light-reflecting unit further includes a second light-reflecting portion, a third light-reflecting portion, and a fourth light-reflecting portion, the first light-reflecting portion is configured to divert the light from the first path to a fourth path, the third light-reflecting portion is configured to divert the light from the fourth path to a fifth path, and the fourth light-reflecting portion is configured to divert the light from the fifth path to a sixth path leading to the second light-reflecting portion, and the second light-reflecting portion is configured to divert the light from the sixth path to the second path.

In an embodiment of the disclosure, the second light-reflecting portion of the light-reflecting unit is substantially parallel to the beam-splitting unit.

In an embodiment of the disclosure, the first path is substantially parallel to the sixth path.

In an embodiment of the disclosure, a unit vector $\hat{r}_1$ along the second path, a unit vector $\hat{r}_2$ along the third path, and a unit normal vector $\hat{n}_1$ of the second light-reflecting portion of the light-reflecting unit satisfy an equation: $\hat{r}_2 = \hat{r}_1 - 2(\hat{r}_1 \cdot \hat{n}_1) \hat{n}_1$.

In an embodiment of the disclosure, the teleprompter further includes a block body disposed in the accommodating space opposing the electronic device and disposed between the second light-reflecting portion and the fourth light-reflecting portion.

In an embodiment of the disclosure, the light-reflecting unit includes a convex mirror or a concave mirror.

Accordingly, in the teleprompter of some embodiments of the present disclosure, the functions of image display and photography can be achieved at the same time with one single electronic device. Integration of image display control and camera control into one single remote control or user interface may be achieved thereby with an appropriate mobile application. Furthermore, the configuration of the light-reflecting unit and the beam-splitting unit is adjusted to make the light enter the user's eyes in a direction substantially parallel to the optical axis of the lens. As such, the image quality can be ensured while allowing the teleprompter to be used with various electronic devices. Compared with commonly used teleprompters, the teleprompter of some embodiments of the present disclosure can simplify operations, provide more configuration options, and extend the scope of application.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
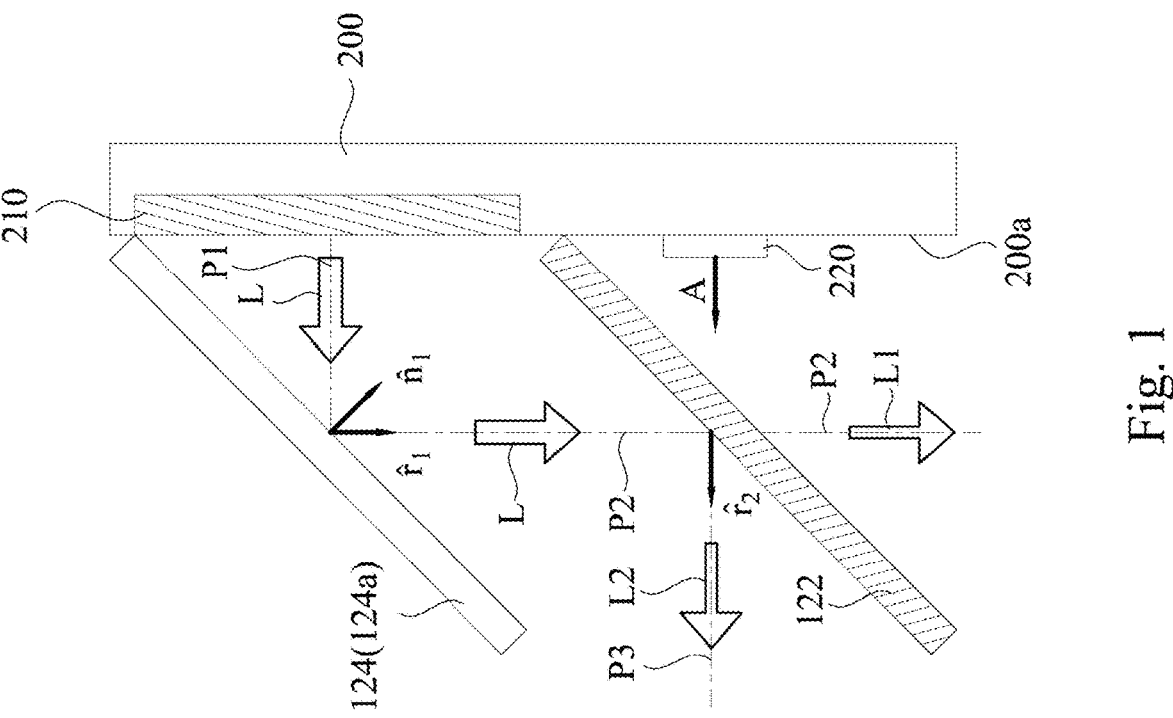
FIG. 1 to FIG. 8 are top views of a teleprompter according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Some embodiments of the present disclosure are intended to propose a teleprompter that can use one single electronic device to provide image display and camera functions simultaneously.

Reference is made to FIG. 1. FIG. 1 is a top view of a teleprompter 100 according to some embodiments of the present disclosure. The teleprompter 100 is configured to collaborate with an electronic device 200 and to provide image display and camera functions simultaneously using the electronic device 200.

The electronic device 200 includes an image display unit 210 and a lens 220. As shown in FIG. 1, the image display unit 210 of the electronic device 200 is configured to emit light L of the image screen along a first path P1.

In some embodiments, the image display unit 210 and the lens 220 are disposed on the same side of the electronic device 200, such as the first surface 200a shown in FIG. 1. In some embodiments, the electronic device 200 may be a foldable smartphone, a smartphone with a reversible camera, or a camera with an articulating screen. The display screens of the aforementioned smartphones may serve as the image display unit 210, and the cameras of the smartphones may serve as the lens 220. Although most smartphones have a front camera and a rear camera, the rear one usually has higher level specifications such as higher resolution than the front one. Therefore, to achieve as high image quality as possible, the teleprompter in some embodiments of the present disclosure is preferably collaborated with the rear camera of a smartphone.

As shown in FIG. 1, the teleprompter 100 includes an optical assembly 120. The optical assembly 120 is configured in a way that the light L emitted by the image display unit 210 at least partially enters the user's eyes so that the user can see the image screen of the image display unit 210. In some embodiments, the screen content images of the image display unit 210 may include movie scripts, texts, graphics, slides, or real-time images, but the present disclosure is not limited thereto.

The optical assembly 120 is configured to make the user look toward the camera easily when he or she is receiving the information provided by the image display unit 210 during the recording session so that the user shown on the screen seems to be looking into the camera. Therefore, the optical assembly 120 is configured to make the optical path of the light emitted by the image display unit 210 enter the user's eyes in the same direction as the optical axis A of the lens 220.

For example, as shown in FIG. 1, the optical assembly 120 includes a light-reflecting unit 124 and a beam-splitting unit 122. The light-reflecting unit 124 is configured to divert the light L from the first path P1 to a second path P2. The beam-splitting unit 122 is configured to allow a first portion L1 of the light L to transmit and to divert a second portion L2 of the light L. For example, the beam-splitting unit 122 diverts the second portion L2 of the light L from the second path P2 to the third path P3. Then, the second portion L2 of the light L enters the user's eyes along the third path P3. As aforementioned, to make the user look directly into the camera while reading the screen content images of the image display unit 210, the beam-splitting unit 122 is configured so that the direction of the reflected second portion L2 of the light L along the third path P3 is substantially parallel to the optical axis A of the lens 220 and the two substantially coincident, as shown in FIG. 1.

In some embodiments, the beam-splitting unit 122 may be a beam splitter with an incident angle of 45° and a 50/50 splitting ratio.

In different embodiments, the light-reflecting unit 124 may include different numbers of light-reflecting portions. For example, in the configuration of FIG. 1, the light-reflecting unit 124 includes one light-reflecting portion, that is, the first light-reflecting portion 124a. The first light-reflecting portion 124a is disposed on the first path P1 and is configured to divert the light L from the first path P1 to the second path P2. In some embodiments, the light-reflecting unit 124 may be a flat mirror.

To make the direction of the third path P3 substantially parallel to and substantially coincides with the optical axis A of the lens 220, as shown in FIG. 1, the unit vector $\hat{r}_1$ along the second path P2, the unit vector $\hat{r}_2$ along the third path P3, and the unit normal vector $\hat{n}_1$ of the reflecting surface of the first light-reflecting portion 124a satisfies an equation: $\hat{r}_2 = \hat{r}_1 - 2(\hat{r}_1 \cdot \hat{n}_1)\hat{n}_1$.

Furthermore, to make the direction of the third path P3 substantially parallel to and substantially coincides with the optical axis A of the lens 220, in some embodiments, the reflective surface of the first light-reflecting portion 124a faces the light emitting direction of the image display unit 210. In some embodiments, the reflective surface of the first light-reflecting portion 124a is substantially parallel to the beam-splitting unit 122. In some embodiments, the angle between the reflective surface of the first light-reflecting portion 124a and the first surface 200a of the electronic device 200 is substantially 45°, and the angle between the beam-splitting unit 122 and the first surface 200a is substantially 45°.

Figure 2:
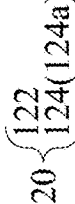
Figure 2:
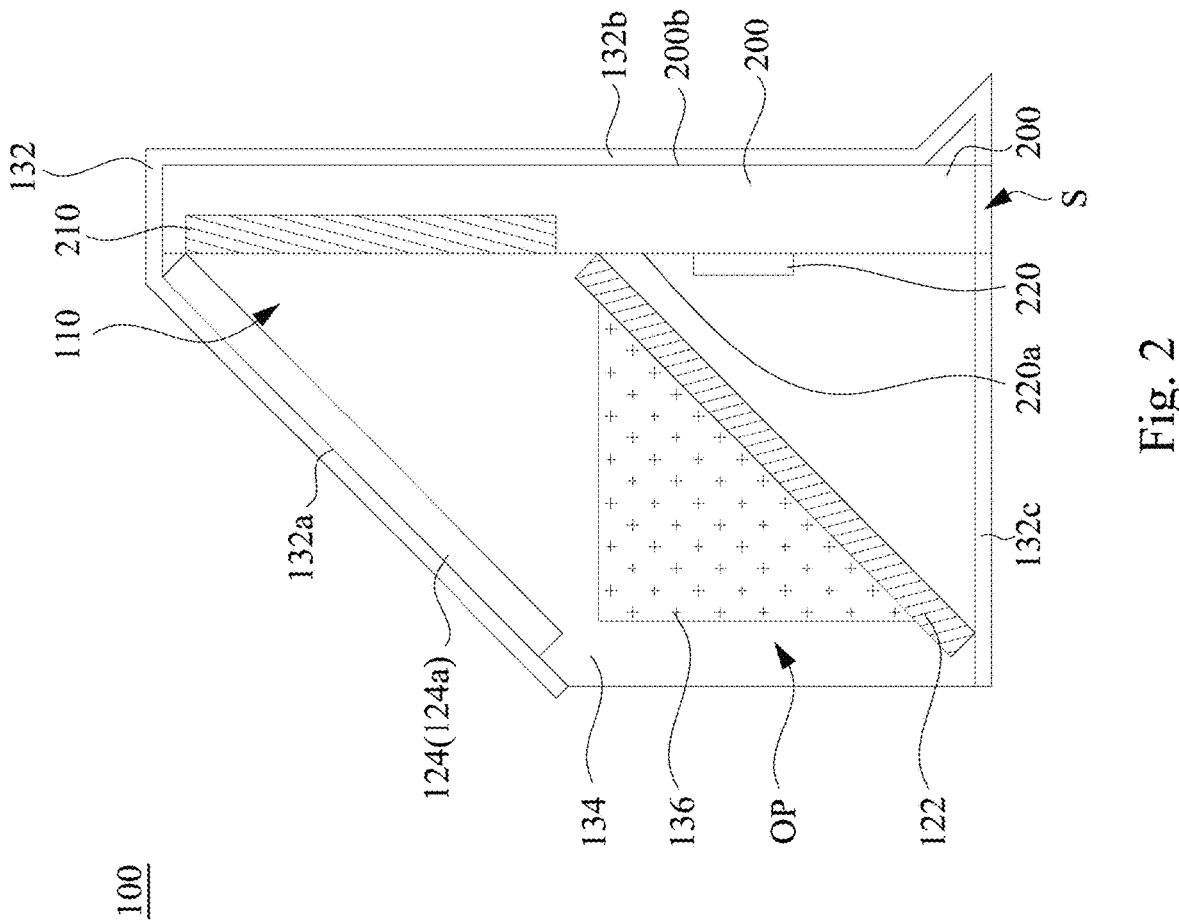

Reference is made to FIG. 2. FIG. 2 is a top view of the teleprompter 100 according to some embodiments of the present disclosure. As shown in FIG. 2, the teleprompter 100 may further include a plate 132 and a plate 134. To be more specific, in some embodiments, the plate 132 has a plurality of folding portions, such as a folding portion 132a, a folding portion 132b, and a folding portion 132c. The number of folding portions of the plate 132 may be increased or decreased according to different embodiments without departing from the scope of the present disclosure. As shown in FIG. 2, the first light-reflecting portion 124a is provided inside the folding portion 132a. The folding portion 132b is configured for the second surface 200b of the electronic device 200 to abut. The folding portion 132c is configured for one end of the beam-splitting unit 122 to abut. The plate 134 is provided at one end of the plate 132 and is connected to the folding portion 132a, the folding portion 132b, and the folding portion 132c. In some embodiments, the plate 134 and the plate 132 are substantially perpendicular to each other, but the present disclosure is not limited thereto. The plate 132 and the plate 134 surround and define an accommodating space 110 for accommodating at least a portion of the electronic device 200. At the same time, the plate 132 and the plate 134 surround and define an opening OP so that the light reflected by the optical assembly 120 (such as by the second portion L2 of the light L in FIG. 1) can be directed to the user through the opening OP. In other words, the direction of the opening OP is substantially the same as the direction of the optical axis A of the lens 220. As shown in FIG. 2, the folding portion 132c of the plate 132 may include a slot S. The electronic device 200 can be disposed in the accommodating space 110 through the slot S.

In some embodiments, the plate 132 and the plate 134 may have a plurality of shallow grooves (not shown) for positioning the optical assembly 120 and the electronic device 200. The plate 132 and the plate 134 may include light-absorbing materials and are configured to absorb the light diffused into the accommodating space 110 (such as external ambient light entering from the opening OP or the slot S) to improve image contrast. In some embodiments, the plate 132 and the plate 134 have a foldable structure so that the teleprompter 100 can be folded and stored when the electronic device 200 is not accommodated in the accommodating space 110. Therefore, the teleprompter 100 can be lightweight and easy to carry.

As shown in FIG. 2, the teleprompter 100 may further include a protruding portion 136. The protruding portion 136 is disposed on a side of the plate 134 facing the accommodating space 110 and is configured to support or abut the beam-splitting unit 122 to position the beam-splitting unit 122. For example, the protruding portion 136 is configured to fix the angle between the beam-splitting unit 122 and the first surface 200a of the electronic device 200.

Figure 3:
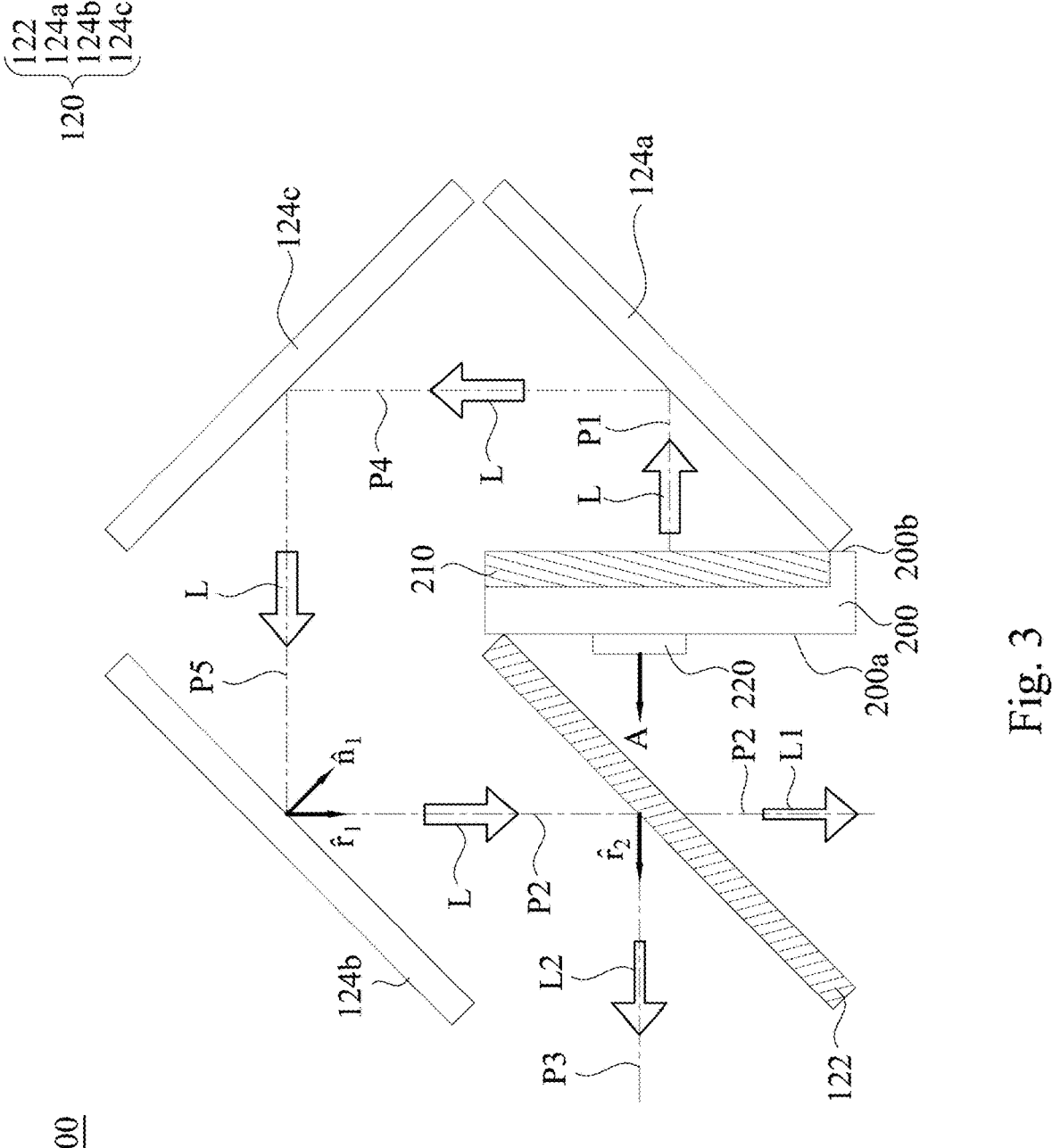

Reference is made to FIG. 3. FIG. 3 is a top view of a teleprompter 300 according to some embodiments of the present disclosure. One difference between the teleprompter 300 and the teleprompter 100 is that, as shown in FIG. 3, the image display unit 210 and the lens 220 are disposed on opposite sides of the electronic device 200. For example, the lens 220 is disposed on the first surface 200a of the electronic device 200. The first surface 200a is adjacent to the beam-splitting unit 122. The image display unit 210 is disposed on the second surface 200b of the electronic device 200. The second surface 200b is away from the beam-splitting unit 122. In these embodiments, the electronic device 200 may be a common smartphone or camera.

Another difference between the teleprompter 300 and the teleprompter 100 is that the light-reflecting unit 124 of the optical assembly 120 of the teleprompter 300 includes three light-reflecting portions. To be more specific, as shown in FIG. 3, the light-reflecting unit 124 includes a first light-reflecting portion 124a, a second light-reflecting portion 124b, and a third light-reflecting portion 124c. As shown in FIG. 3, the first light-reflecting portion 124a is adjacent to the image display unit 210 and is disposed on the first path P1 along which the image display unit 210 emits the light L.

Since the light-reflecting unit 124 of the teleprompter 300 includes the second light-reflecting portion 124b and the third light-reflecting portion 124c, the optical path of the light L before reaching the beam-splitting unit 122 is different from that of the teleprompter 100. To be more specific, as shown in FIG. 3, the first light-reflecting portion 124a is configured to divert the light L from the first path P1 to a fourth path P4. The third light-reflecting portion 124c is configured to divert the light L from the fourth path P4 to a fifth path P5. The second light-reflecting portion 124b is configured to divert the light L from the fifth path P5 to the second path P2 leading toward the beam-splitting unit 122. In some embodiments, the first path P1 is substantially parallel to the fifth path P5.

As aforementioned, to make the third path P3 substantially parallel to and substantially coincides with the optical axis A of the lens 220, as shown in FIG. 3, the unit vector $\hat{r}_1$ along the second path P2 and the unit vector $\hat{r}_2$ along the third path P3, and the unit normal vector $\hat{n}_1$ of the reflecting surface of the second light-reflecting portion 124b satisfies the equation: $\hat{r}_2 = \hat{r}_1 - 2(\hat{r}_1 \cdot \hat{n}_1)\hat{n}_1$.

Furthermore, to make the direction of the third path P3 substantially parallel to and substantially coincides with the optical axis A of the lens 220, in some embodiments, as shown in FIG. 3, the reflective surface of the second light-reflecting portion 124b faces the beam-splitting unit 122 and is substantially parallel to the beam-splitting unit 122. In some embodiments, the reflective surface of the third light-reflecting portion 124c is substantially perpendicular to the reflective surface of the first light-reflecting portion 124a.

Furthermore, in some embodiments, the reflective surface of the first light-reflecting portion 124a is substantially parallel to the beam-splitting unit 122. In some embodiments, the angle between the reflective surface of the first light-reflecting portion 124a and the second surface 200b of the electronic device 200 is substantially 45°. The angle between the beam-splitting unit 122 and the first surface 200a of the electronic device 200 is substantially 45°. In some embodiments, the reflective surface of the second light-reflecting portion 124b is substantially parallel to the reflective surface of the first light-reflecting portion 124a. In some embodiments, the reflective surface of the third light-reflecting portion 124c is substantially perpendicular to the reflective surface of the second light-reflecting portion 124b.

Figure 4:
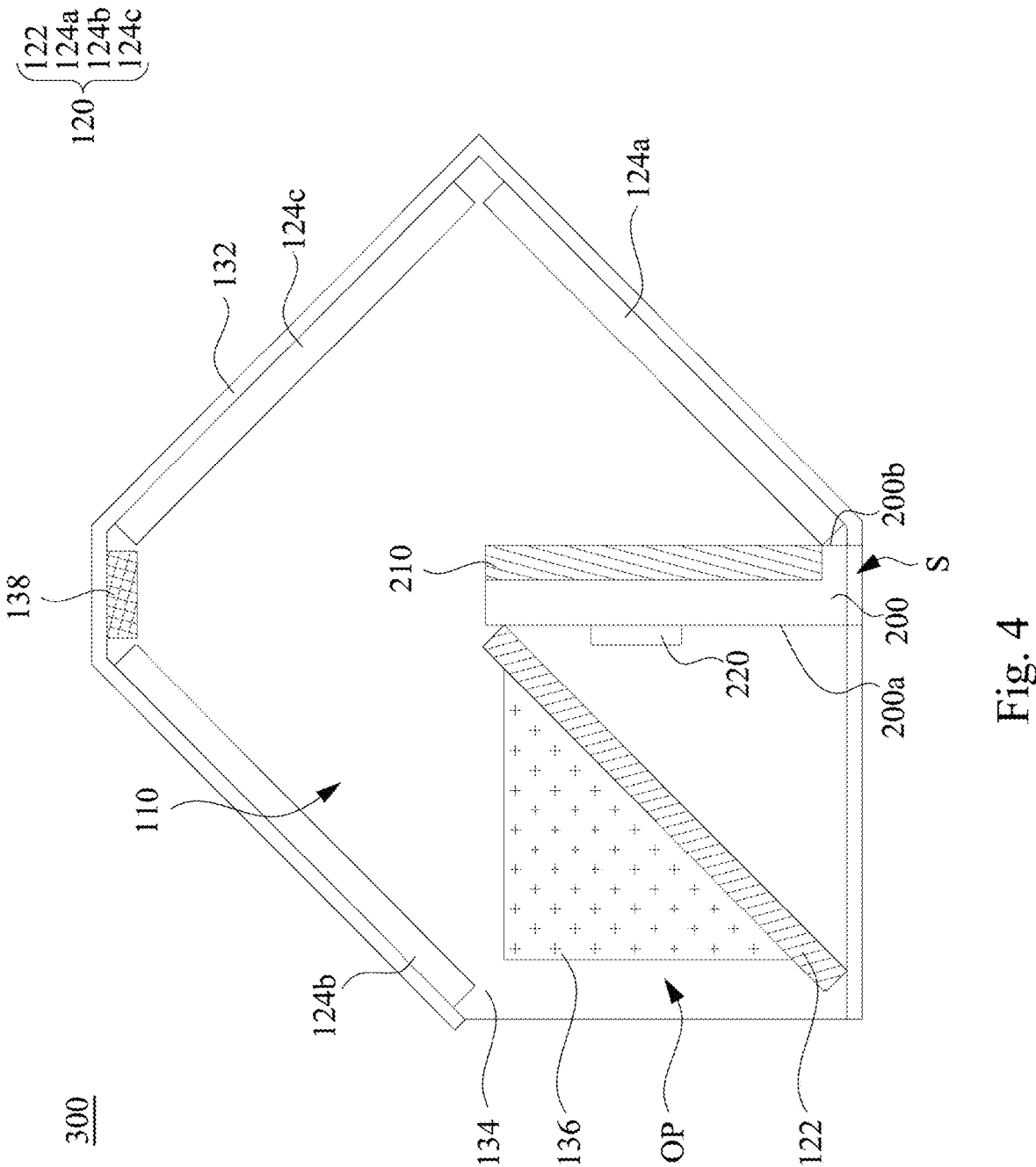

Reference is made to FIG. 4. FIG. 4 is a top view of the teleprompter 300 according to some embodiments of the present disclosure. As shown in FIG. 4, the teleprompter 300 may further include a plate 132 and a plate 134. Similar to the teleprompter 100, the plate 132 and the plate 134 of the teleprompter 300 surround and define the accommodating space 110 and define the opening OP. The axial direction of the opening OP is substantially the same as the direction of the optical axis A of the lens 220 so that the light such as the second portion L2 of the light L in FIG. 3 reflected by the optical assembly 120 is directed toward the user through the opening OP.

Similar to the teleprompter 100, in some embodiments, the plate 132 and the plate 134 of teleprompter 300 may have a plurality of shallow grooves (not shown) for positioning the optical assembly 120 and the electronic device 200. The plate 132 and the plate 134 may include light-absorbing materials and are configured to absorb the light diffused into the accommodating space 110. In some embodiments, the plate 132 and the plate 134 have a foldable structure to facilitate folding and storage of the teleprompter 300 when the teleprompter 300 does not accommodate the electronic device 200.

Similar to the teleprompter 100, as shown in FIG. 4, the teleprompter 300 may further include a protruding portion 136. The protruding portion 136 is disposed on a side of the plate 134 facing the accommodating space 110 and is configured to support or abut the beam-splitting unit 122 to position the beam-splitting unit 122.

In some embodiments, as shown in FIG. 4, the teleprompter 300 may further include a block body 138. The block body 138 is disposed in the accommodating space 110. The block body 138 may include light-absorbing materials. The block body 138 is configured to absorb light diffused into the accommodating space 110. In some embodiments, the block body 138 is disposed on a side of the plate 132 facing the accommodating space 110. In some embodiments, the block body 138 is disposed on a side in a way that the relative direction of the side relative to the electronic device 200 is substantially the same direction along which electronic device 200 is placed in the slot S, such as along the axial direction of the slot S. In some embodiments, the block body 138 is disposed between the second light-reflecting portion 124b and the third light-reflecting portion 124c.

In addition, in some embodiments, the size and the shape of the block body 138 are adjusted with the size of the slot S to accommodate the electronic device 200 of different specifications. For example, the dimensions of the slot S such as the lateral length of the slot S in FIG. 4 may be positively correlated with the specifications such as the thickness of the electronic device 200. In turn, the dimensions of the block body 138 such as the lateral length of the block body 138 in FIG. 4 are positively correlated with the dimensions of the slot S. By disposing a suitable shape of the block body 138, the block body 138 can also be used to facilitate positioning of each unit of the optical assembly 120. It should be understood that the block body 138 may be applied to other embodiments according to requirements without departing from the scope of the present disclosure.

Figure 5:
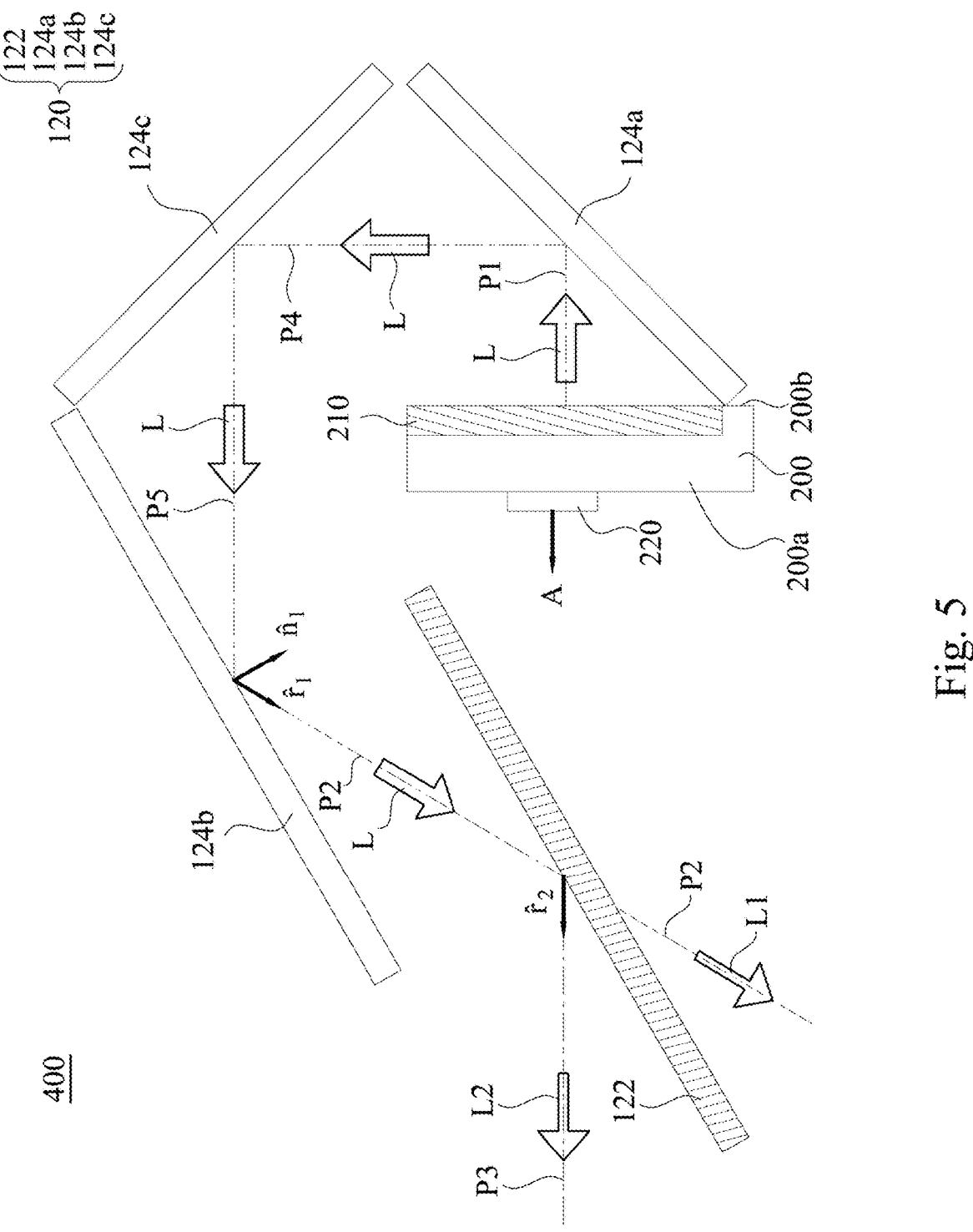
Figure 6:
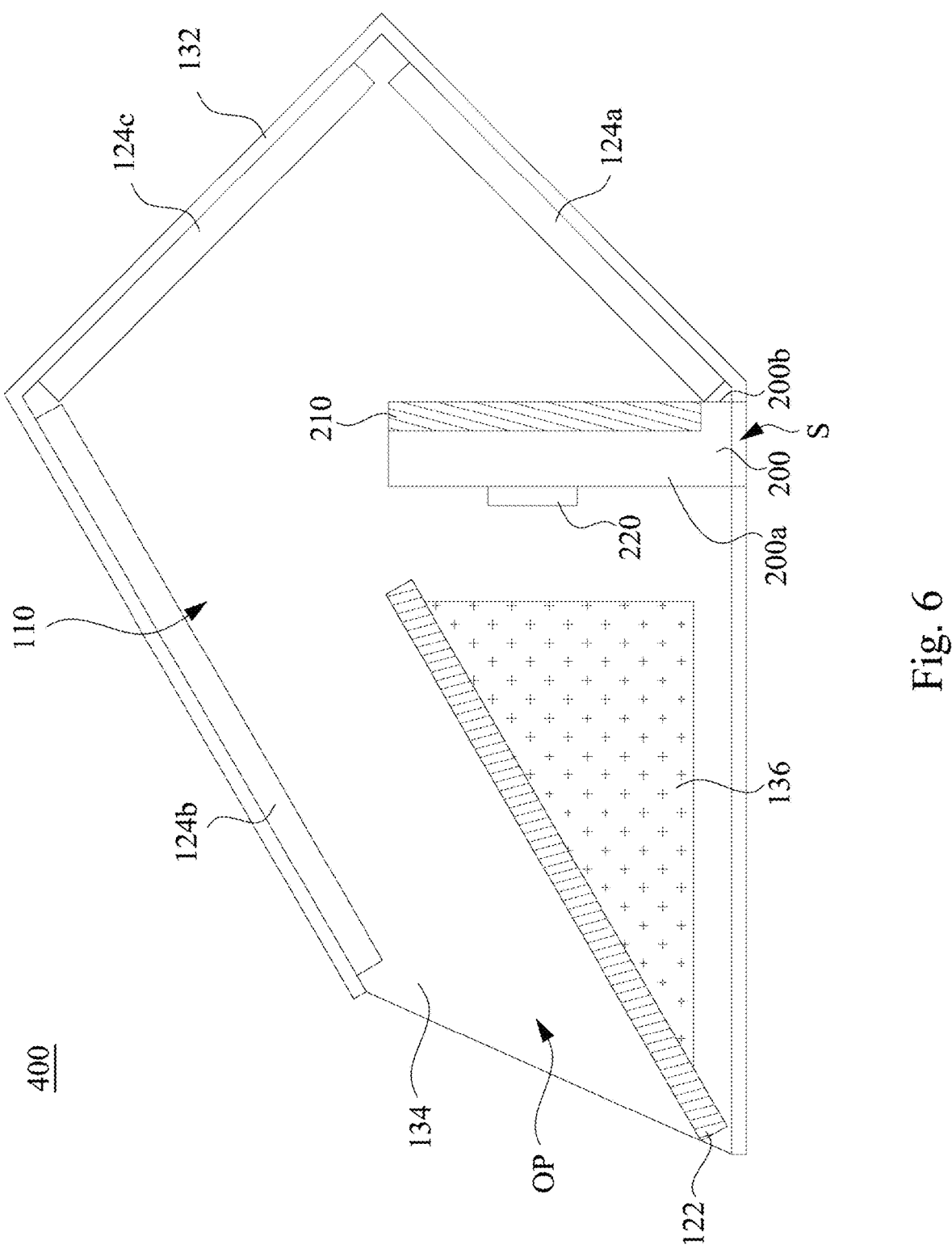

Reference is made to FIG. 5 and FIG. 6. FIG. 5 and FIG. 6 are top views of a teleprompter 400 according to some embodiments of the present disclosure. One difference between the teleprompter 400 and the teleprompter 300 is that, in some embodiments, as shown in FIG. 5, the reflective surface of the first light-reflecting portion 124a is not parallel to the beam-splitting unit 122. In some embodiments, the reflective surface of the second light-reflecting portion 124b is not parallel to the reflective surface of the first light-reflecting portion 124a. In some embodiments, the angle between the reflective surface of the third light-reflecting portion 124c and the reflective surface of the second light-reflecting portion 124b is greater than 90°.

Another difference between the teleprompter 400 and the teleprompter 300 is that, as shown in FIG. 6, the teleprompter 400 does not include the block body 138 of the teleprompter 300 and the position of the protruding portion 136 of the teleprompter 400 on the plate 134 is different from the position of the protruding portion 136 of the teleprompter 300.

Figure 7:
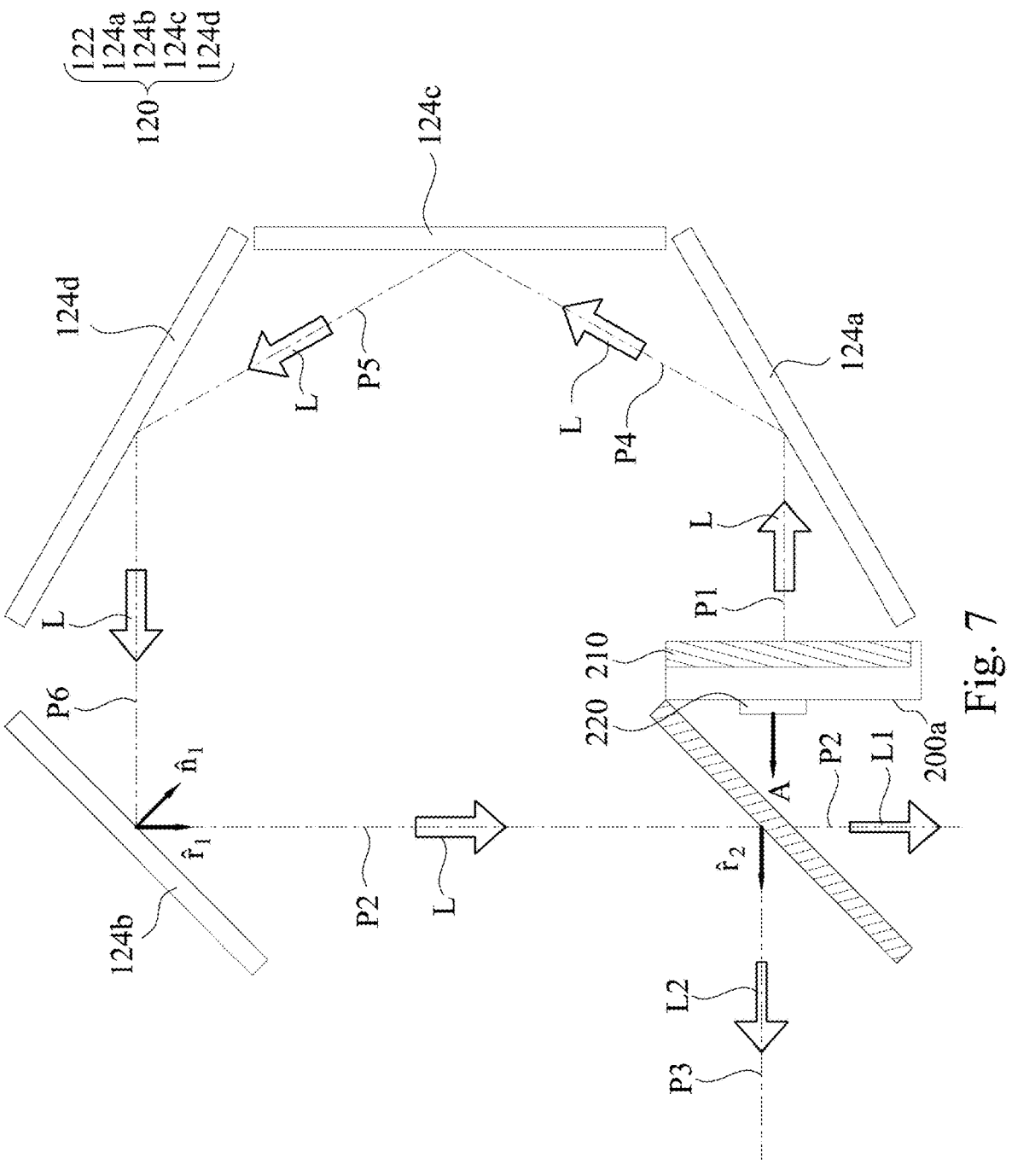

Reference is made to FIG. 7. FIG. 7 is a top view of a teleprompter 500 according to some embodiments of the present disclosure. One difference between the teleprompter 500 and the teleprompter 300 is that, the light-reflecting unit 124 of the optical assembly 120 of the teleprompter 500 includes four light-reflecting portions. To be more specific, as shown in FIG. 7, the light-reflecting unit 124 includes a first light-reflecting portion 124a, a second light-reflecting portion 124b, a third light-reflecting portion 124c and a fourth light-reflecting portion 124d.

Since the light-reflecting unit 124 of the teleprompter 500 includes the fourth light-reflecting portion 124d, the optical path of the light L before reaching the second light-reflecting portion 124b is different from that of the teleprompter 300. To be more specific, as shown in FIG. 7, the first light-reflecting portion 124a is configured to divert the light L from the first path P1 to the fourth path P4. The third light-reflecting portion 124c is configured to divert the light L from the fourth path P4 to the fifth path P5. The fourth light-reflecting portion 124d is configured to divert the light L from the fifth path P5 to a sixth path P6 leading toward the second light-reflecting portion 124b. In some embodiments, the first path P1 is substantially parallel to the sixth path P6.

Similarly, to make the direction of the third path P3 substantially parallel to and substantially coincides with the optical axis A of the lens 220, as shown in FIG. 7, the unit vector $\hat{r}_1$ along the second path P2, the unit vector $\hat{r}_2$ along the third path P3, and the unit normal vector $\hat{n}_1$ of the reflective surface of the second light-reflecting portion 124b satisfies the equation: $\hat{r}_2 = \hat{r}_1 - 2(\hat{r}_1 \cdot \hat{n}_1)\hat{n}_1$.

Furthermore, to make the direction of the third path P3 substantially parallel to and substantially coincides with the optical axis A of the lens 220, in some embodiments, as shown in FIG. 7, the reflective surface of the second light-reflecting portion 124b faces the beam-splitting unit 122 and is substantially parallel to the beam-splitting unit 122.

Moreover, in some embodiments, the reflective surface of the third light-reflecting portion 124c is substantially parallel to the second path P2. In some embodiments, the reflective surface of the first light-reflecting portion 124a faces the light emitting direction of the image display unit 210. In some embodiments, the reflective surface of the fourth light-reflecting portion 124d faces the reflective surface of the first light-reflecting portion 124a. In some embodiments, the reflective surface of the fourth light-reflecting portion 124d faces the reflective surface of the second light-reflecting portion 124b. In some embodiments, the reflective surface of the second light-reflecting portion 124b faces the reflective surface of the first light-reflecting portion 124a across the electronic device 200. In some embodiments, the reflective surface of the second light-reflecting portion 124b faces the reflective surface of the third light-reflecting portion 124c. In some embodiments, the reflective surface of the first light-reflecting portion 124a is opposite to the beam-splitting unit 122 across the electronic device 200 and is not parallel to the beam-splitting unit 122. In some embodiments, the angle between the beam-splitting unit 122 and the first surface 200a is substantially 45°.

Figure 8:
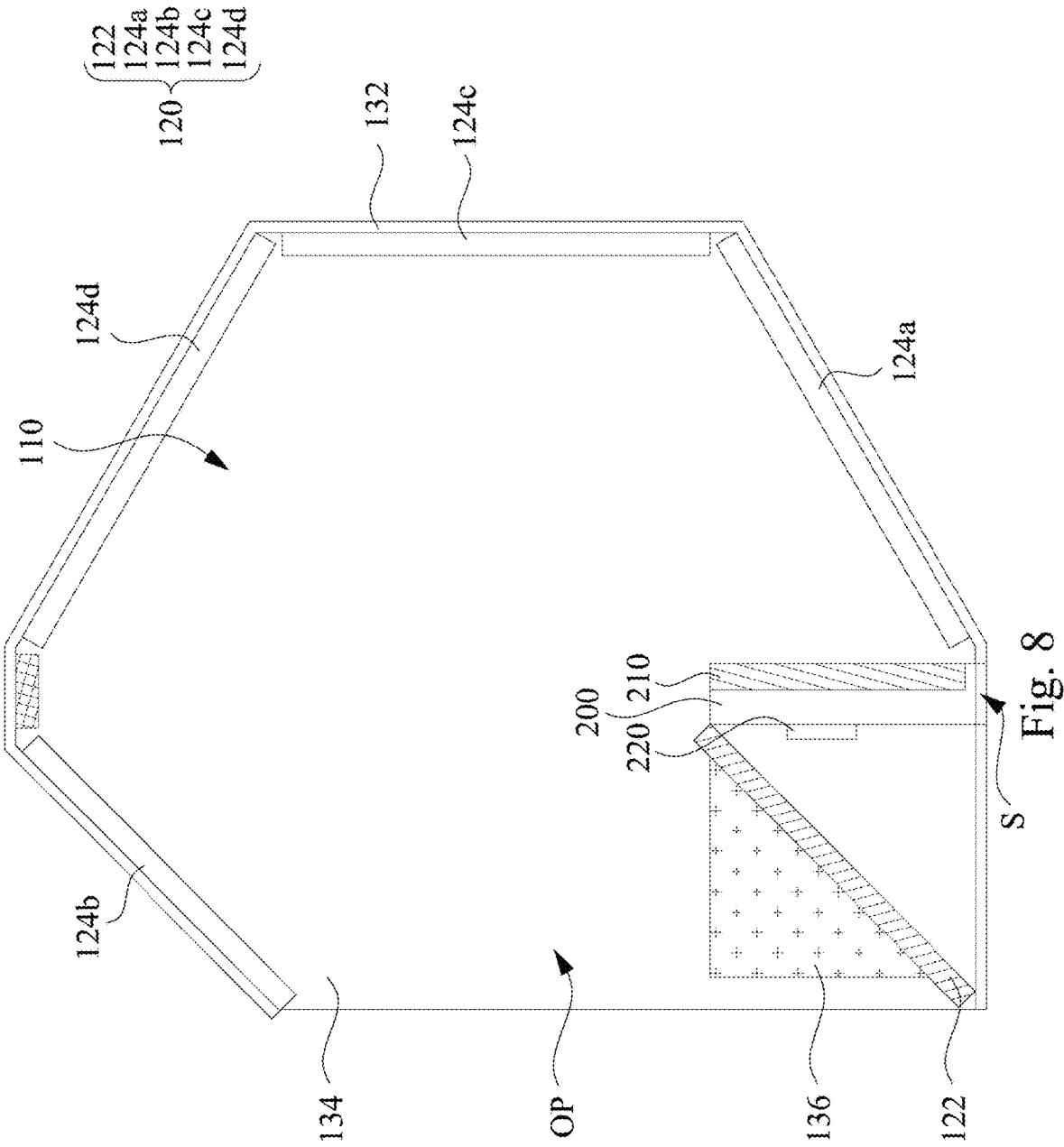

Reference is made to FIG. 8. FIG. 8 is a top view of the teleprompter 500 according to some embodiments of the present disclosure. As shown in FIG. 8, the teleprompter 500 may further include a plate 132 and a plate 134. Similar to the teleprompter 300, the plate 132 and the plate 134 of the teleprompter 500 surround and define the accommodating space 110 and define the opening OP. The axial direction of the opening OP is substantially the same as the direction of the optical axis A of the lens 220 so that the light such as the second portion L2 of the light L in FIG. 7 reflected by the optical assembly 120 is directed to the user through the opening OP.

Similar to the teleprompter 300, in some embodiments, the plate 132 and the plate 134 may have a plurality of shallow grooves (not shown) for positioning the optical assembly 120 and the electronic device 200. The plate 132 and the plate 134 may include light-absorbing materials and are configured to absorb the light diffused into the accommodating space 110. In some embodiments, the plate 132 and the plate 134 have a foldable structure to facilitate folding and storage of the teleprompter 500 when the teleprompter 500 does not accommodate the electronic device 200.

Similar to the teleprompter 300, as shown in FIG. 8, the teleprompter 500 may further include a protruding portion 136 and a block body 138 discussed in the previous paragraphs.

In some embodiments, the light-reflecting unit 124 may include a convex mirror or a concave mirror. By selecting the curvature and focal length of the convex or concave mirror, the imaging effect can be adjusted. For example, choosing the curvature and focal length of a convex mirror can increase the field of view (FOV). For example, by selecting the curvature and focal length of a concave mirror, the image observed by the user after reflection can be an upright virtual image.

Figure 9:
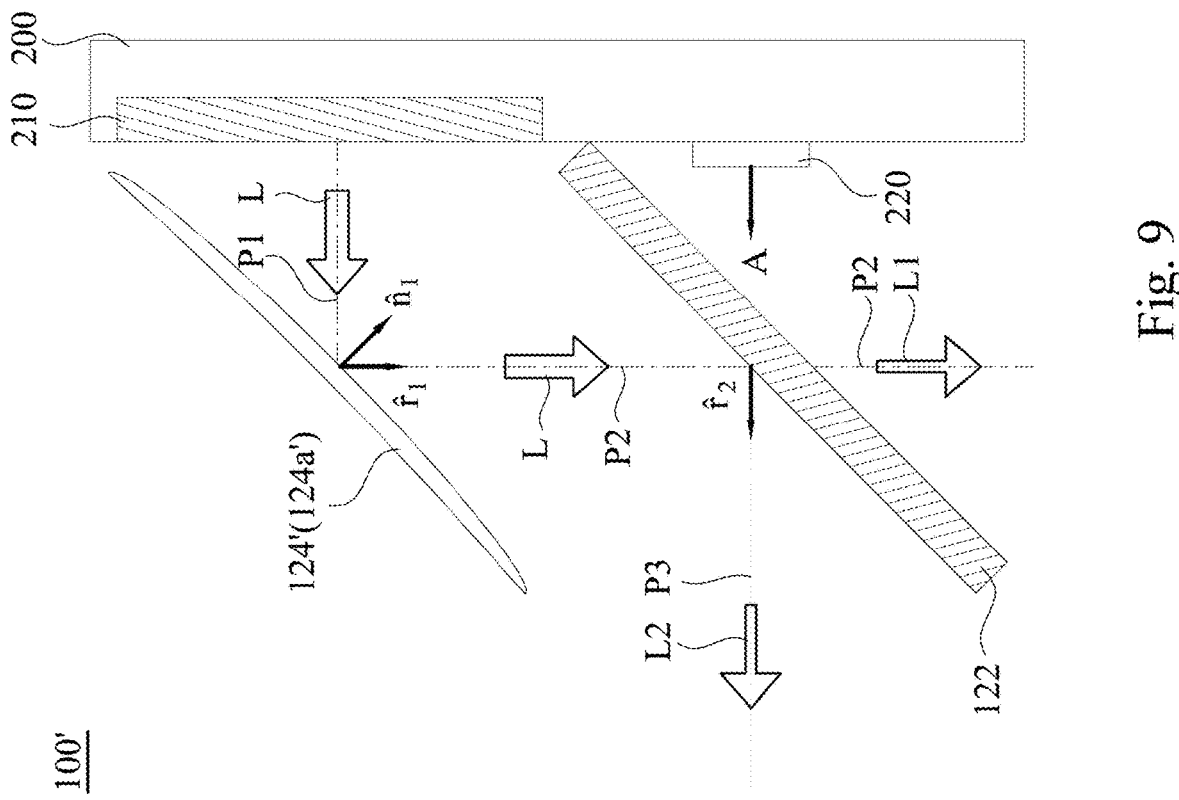
FIG. 9 to FIG. 12 are top views of a teleprompter according to some other embodiments of the present disclosure.
Figure 10:
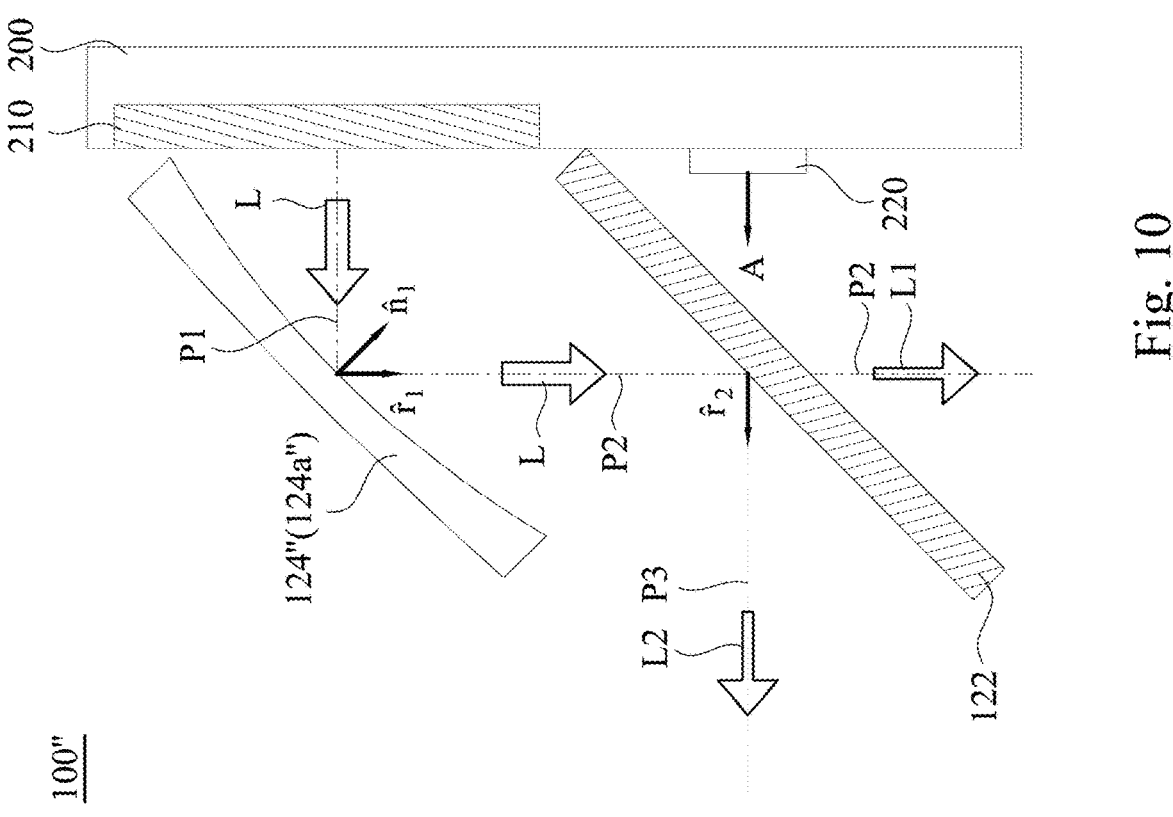

Reference is made to FIG. 9 and FIG. 10. FIG. 9 and FIG. 10 are top views of a teleprompter 100' and a teleprompter 100", respectively, according to some other embodiments of the present disclosure. As shown in FIG. 9, the difference between the teleprompter 100' and the teleprompter 100 is that the light-reflecting unit 124', that is, the first light-reflecting portion 124a', of the optical assembly 120' of the teleprompter 100' is a convex mirror. As shown in FIG. 9, the unit normal vector $\hat{n}_1$ of the reflective surface of the first light-reflecting portion 124a' is set to satisfy the equation: $\hat{r}_2 = \hat{r}_1 - 2(\hat{r}_1 \cdot \hat{n}_1)\hat{n}_1$ so that the direction of the third path P3 is substantially parallel to and substantially coincides with the optical axis A of the lens 220.

Similarly, as shown in FIG. 10, the difference between the teleprompter 100" and the teleprompter 100 is that the light-reflecting unit 124", that is, the first light-reflecting portion 124a", of the optical assembly 120" of the teleprompter 100" is a concave mirror. As shown in FIG. 10, the unit normal vector $\hat{n}_1$ of the reflecting surface of the first light-reflecting portion 124a" is set to satisfy the equation: $\hat{r}_2 = \hat{r}_1 - 2(\hat{r}_1 \cdot \hat{n}_1)\hat{n}_1$ so that the direction of the third path P3 is substantially parallel to and substantially coincides with the optical axis A of the lens 220.

Figure 11:
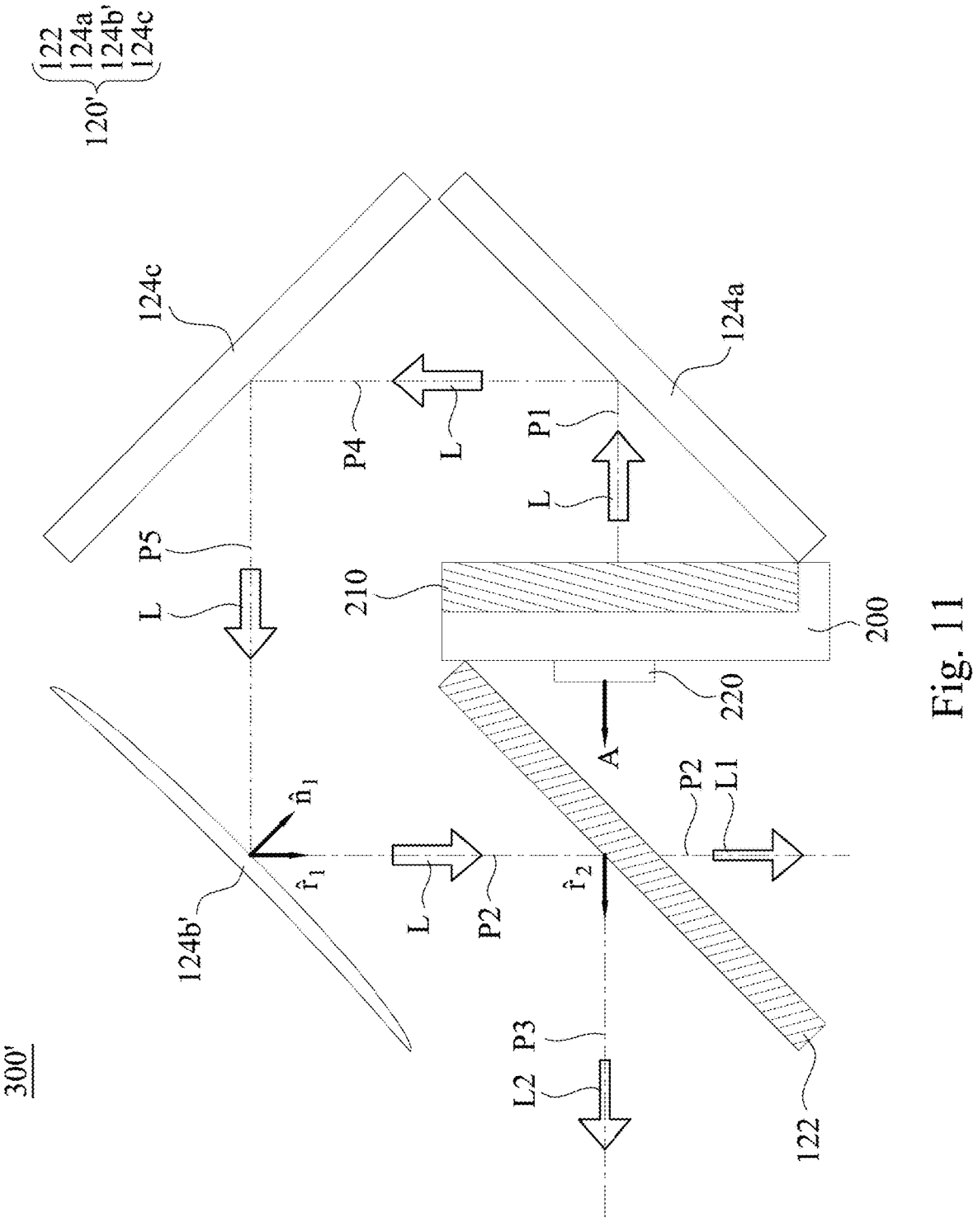
Figure 12:
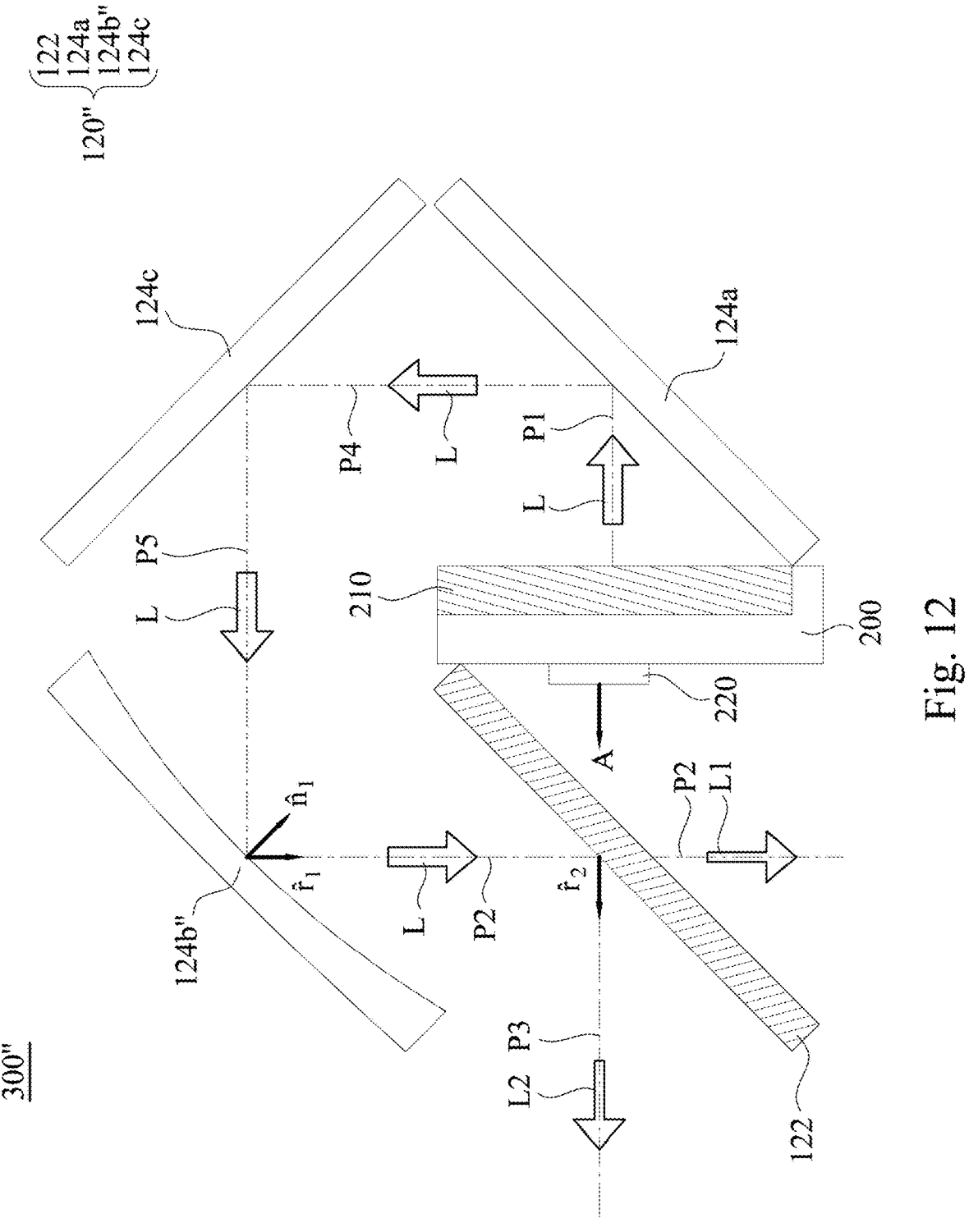

Reference is made to FIG. 11 and FIG. 12. FIG. 11 and FIG. 12 are top views of a teleprompter 300' and a teleprompter 300", respectively, according to yet some other embodiments of the present disclosure. As shown in FIG. 11, the difference between the teleprompter 300' and the teleprompter 300 is that the second light-reflecting portion 124b' of the optical assembly 120' of the teleprompter 300' is a convex mirror. As shown in FIG. 11, the unit normal vector $\hat{n}_1$ of the reflective surface of the second light-reflecting portion 124b' is set to satisfy the equation: $\hat{r}_2 = \hat{r}_1 - 2(\hat{r}_1 \cdot \hat{n}_1)\hat{n}_1$ so that the third path P3 is substantially parallel to and substantially coincides with the optical axis A of the lens 220.

Similarly, as shown in FIG. 12, the difference between the teleprompter 300" and the teleprompter 300 is that the second light-reflecting portion 124b" of the optical assembly 120" of the teleprompter 300" is a concave mirror. As shown in FIG. 12, the unit normal vector $\hat{n}_1$ of the reflective surface of the second light-reflecting portion 124b" is set to satisfy the equation: $\hat{r}_2 = \hat{r}_1 - 2(\hat{r}_1 \cdot \hat{n}_1)\hat{n}_1$ so that the third path P3 is substantially parallel to and substantially coincides with the optical axis A of the lens 220.

According to the foregoing recitations of the embodiments of the disclosure, it may be seen that in the teleprompter of some embodiments of the present disclosure, the functions of image display and photography can be achieved at the same time with one single electronic device. Integration of image display control and camera control into one single remote control or user interface may be achieved thereby with an appropriate mobile application. Furthermore, the configuration of the light-reflecting unit and the beam-splitting unit is adjusted to make the light enter the user's eyes in a direction substantially parallel to the optical axis of the lens. As such, the image quality can be ensured while allowing the teleprompter to be used with various electronic devices. Compared with commonly used teleprompters, the teleprompter of some embodiments of the present disclosure can simplify operations, provide more configuration options, and extend the scope of application.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A teleprompter, comprising:
an accommodating space configured for accommodating an electronic device, wherein the electronic device comprises an image display unit and a lens, and the image display unit is configured to emit a light along a first path,
wherein the lens is disposed on a first surface of the electronic device, and the image display unit is disposed on a second surface of the electronic device opposing the first surface; and an optical assembly disposed in the accommodating space and comprising a light-reflecting unit and a beam-splitting unit, wherein the light-reflecting unit is configured to divert the light from the first path to a second path, the light-reflecting unit has a first light-reflecting portion, a second light-reflecting portion, and a third light-reflecting portion, wherein the first light-reflecting portion is disposed on the first path and is configured to divert the light from the first path to a fourth path, the third light-reflecting portion is configured to divert the light from the fourth path to a fifth path, the second light-reflecting portion is configured to divert the light from the fifth path to the second path, the beam-splitting unit is disposed on the second path and is configured to allow a first portion of the light to transmit and to divert a second portion of the light from the second path to a third path, and the third path has a same direction as a direction of an optic axis of the lens, wherein the first surface of the electronic device faces the beam-splitting unit, and the second surface of the electronic device faces the first light-reflecting portion of the light-reflecting unit.

2. The teleprompter of claim 1, wherein the second light-reflecting portion of the light-reflecting unit is substantially parallel to the beam-splitting unit.

3. The teleprompter of claim 1, wherein the first path is substantially parallel to the fifth path.

4. The teleprompter of claim 1, wherein a unit vector $\hat{r}_1$ along the second path, a unit vector $\hat{r}_2$ along the third path, and a unit normal vector $\hat{n}_1$ of the second light-reflecting portion of the light-reflecting unit satisfy an equation: $\hat{r}_2 = \hat{r}_1 - 2(\hat{r}_1 \cdot \hat{n}_1)\hat{n}_1$.

5. The teleprompter of claim 1, further comprising a block body disposed in the accommodating space opposing the electronic device and disposed between the second light-reflecting portion and the third light-reflecting portion.

6. The teleprompter of claim 1, wherein the light-reflecting unit comprises a convex mirror or a concave mirror.

* * * * *